US012621625B2

(12) United States Patent
Guo et al.

(10) Patent No.: US 12,621,625 B2
(45) Date of Patent: May 5, 2026

(54) SPATIAL AUDIO COMMUNICATION BETWEEN DEVICES WITH SPEAKER ARRAY AND/OR MICROPHONE ARRAY

(71) Applicant: Google LLC, Mountain View, CA (US)

(72) Inventors: Jian Guo, Sunnyvale, CA (US); Frances Maria Hui Hong Kwee, Redwood City, CA (US)

(73) Assignee: Google LLC, Mountain View, CA (US)

( * ) Notice: Subject to any disclaimer, the term of this patent is extended or adjusted under 35 U.S.C. 154(b) by 297 days.

(21) Appl. No.: 18/124,363

(22) Filed: Mar. 21, 2023

(65) Prior Publication Data

US 2023/0308825 A1 Sep. 28, 2023

Related U.S. Application Data

(60) Provisional application No. 63/322,381, filed on Mar. 22, 2022.

(51) Int. Cl.
*H04R 3/00* (2006.01)
*H04S 7/00* (2006.01)

(52) U.S. Cl.
CPC ............ *H04S 7/302* (2013.01); *H04R 3/005* (2013.01); *H04S 2420/01* (2013.01)

(58) Field of Classification Search
CPC ..................................................... H04R 3/005
See application file for complete search history.

(56) References Cited

U.S. PATENT DOCUMENTS

2015/0036848 A1* 2/2015 Donaldson .............. H04S 7/303 381/303
2015/0139426 A1* 5/2015 Tammi .................. H04R 3/005 381/17
2018/0220250 A1* 8/2018 Järvinen ................ H04S 7/301

* cited by examiner

*Primary Examiner* — James K Mooney
(74) *Attorney, Agent, or Firm* — Colby Nipper PLLC

(57) ABSTRACT

The technology generally relates to spatial audio communication between devices. For example, a first device and a second device may be connected via a communication link. The first device may capture audio signals in an environment through two or more microphones. The first device may encode the captured audio with direction information. The first device may transmit the encoded audio via the communication link to the second device. The second device may decode the encoded audio to be output by one or more speakers of the second device. The second device may output the decoded audio to recreate positions of the captured audio signals.

20 Claims, 6 Drawing Sheets

200A

200A

300A

300B

SPATIAL AUDIO COMMUNICATION BETWEEN DEVICES WITH SPEAKER ARRAY AND/OR MICROPHONE ARRAY

BACKGROUND

Devices may be used for communication between two or more users when the users are separated by a distance, such as for teleconferencing, video conferencing, phone calls, etc. Each device may have a microphone and speaker array. A microphone of a first device may capture audio signals, such as speech of a first user. The captured audio may be transmitted, via a communication link, to a second device for output by speakers of the second device. The transmitted audio and the output audio may be mono audio, thereby lacking spatial cues. A second user listening to the output audio may, therefore, have a dull listening experience, as, without spatial cues, the second user may not have an indication of where the first user was positioned relative to the first device. Moreover, mono audio may prevent the user from having an immersive experience as the speakers of the second device may output the audio equally, thereby failing to provide spatial cues.

SUMMARY

The technology generally relates to spatial audio communication between devices. For example, a first device and a second device may be connected via a communication link. The first device may capture audio signals in an environment through two or more microphones. The first device may encode the captured audio with location information. The first device may transmit the encoded audio via the communication link to the second device. The second device may decode the encoded audio to be output by one or more speakers of the second device. The second device may output the decoded audio to recreate positions of the captured audio signals.

A first aspect of this disclosure generally relates to a device comprising one or more processors. The one or more processors may be configured to receive, from two or more microphones, audio input, determine, based on the received audio input, a location of a source of the audio input relative to the device, and encode audio data associated with the audio input and the determined location.

The one or more processors may be further configured to encode the audio data and the determined location with a timestamp, wherein the timestamp indicates a time the two or more microphones received the audio input. When determining the location of the source, the one or more processors may be further configured to triangulate the location based on a time each of the two or more microphones received the audio input. The one or more processors may be configured to receive encoded audio from a second device. The one or more processors may be further configured to decode the received encoded audio.

The device may further comprise two or more speakers. When decoding the received encoded audio, the one or more processors may be configured to decode the received encoded audio based on the two or more speakers. The one or more processors may be further configured to output the received encoded audio based on the one or more speakers.

Another aspect of this disclosure generally relates to a method comprising the following: receiving, by one or more processors from a device including two or more microphones, audio input; determining, by the one or more processors and based on the received audio input, a location of a source of the audio input relative to the device; and encoding, by the one or more processors, audio data associated with the audio input and the determined location.

Yet another aspect of this disclosure generally relates to a non-transitory computer-readable medium storing instructions, which when executed by one or more processors cause the one or more processors to receive, from two or more microphones, audio input, determine, based on the received audio input, a location of a source of the audio input relative to the device, and encode audio data associated with the audio input and the determined location.

DETAILED DESCRIPTION

Figure 1:
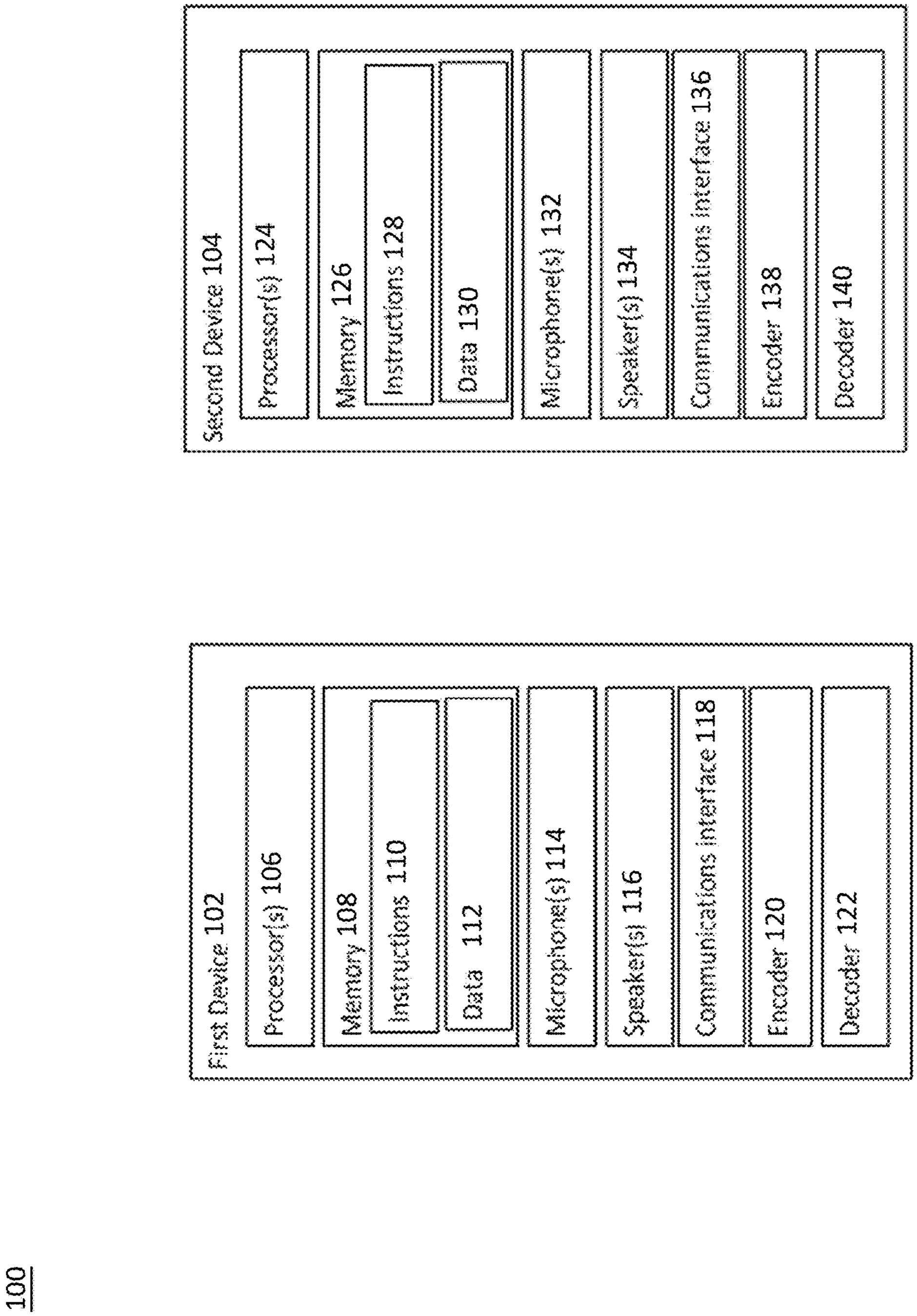
FIG. 1 is a functional block diagram of an example system in accordance with aspects of the disclosure.

The technology generally relates to spatial audio communication between devices. For example, two or more devices may be connected via a communication link such that audio may be transmitted from one device to be output by another. A first device may capture audio signals in an environment through two or more microphones, the audio signals based on sound waves emitted from a source emitter. The two or more microphones may be arranged around the device and may be integrated or non-integrated with the device. The captured audio signals may be encoded with information on a direction of the source emitter. The direction information may be, for example, a relative location of the source emitter with respect to the first device. The first device may transmit the encoded audio to the other devices via the communication link. Each of the other devices may decode the encoded audio for playback by one or more speakers. The playback, or output, may correspond, or substantially correspond, to how a user would have heard the audio input being received by the first device. In some examples, decoded audio may be output spatially by the speakers of the device to correspond to how a user would have heard the audio signals if they were positioned at a location within the environment at and/or near a location of a source of the audio signals.

According to some examples, the first device may capture audio signals in an environment through two or more microphones. The two or more microphones may be arranged around the first device and may be integrated or non-integrated with the first device. The audio signals captured by each microphone may be encoded and transmitted to the second device via separate channels. For example, there may be a separate channel for sending the audio signal for each respective microphone in the environment. The second device may decode each channel. The second device may output each channel for playback on the intended speaker. For example, there may be a right channel, a center channel, and a left channel. Each channel may correspond to a respective speaker such that the right channel may be output by a right speaker, the center channel may be output by a center speaker, and the left channel may be output by a left speaker. According to some examples, the second device may be a stereo device but be configured to output audio in such a way as to create a soundstage, surround sound, spatial, or otherwise directional sound output effect. By way of example only, the second device may be true wireless earbuds configured to output audio that may be perceived by a user as coming from different directions, such as directly in front of or directly behind the user. By way of another example embodiment, the second device may be hearing aids.

According to some examples, encoding the audio signals to include audio data, relative location, source emitter direction, and/or a timestamp of when the audio signal was captured by a microphone may decrease the data required to transmit the encoded audio to the second device in a single channel as compared to transmitting the audio signals via multiple and/or separate channels. According to some examples, the encoded audio may be compressed prior to transmitting the encoded audio to another device. The encoded audio may be compressed when the direction to the audio source emitter is stable. In such an example, the location information may be compressed, which may require less data for transmission.

In some examples, by encoding the audio signals to include the audio data, source emitter direction, and/or the timestamp, the audio may be spatially output to provide a vibrant and/or immersive listening experience. For example, the device receiving the encoded audio may decode the encoded audio to correspond, or substantially correspond, to how a user would have heard the audio signals being received by the first device. In such an example, the spatial audio output may provide the user listening to the output an immersive listening experience, making the user feel like they were at the location where the audio signals were received.

Example Systems

FIG. 1 illustrates an example system including two devices. In this example, system 100 may include a first device 102 and a second device 104. The devices 102, 104 may be, for example, a smartphone, a smart watch, true wireless earbuds, hearing aids, an AR/VR headset, a smart helmet, a computer, a laptop, a tablet, a home assistant device that is capable of receiving audio signals and outputting audio, etc. According to some examples, the home assistant device may be an assistant hub, thermostat, smart display, audio playback device, smart watch, doorbell, security camera, etc. The first device 102 may include one or more processors 106, memory 108, instructions 110, data 112, one or more microphones 114, one or more speakers 116, a communications interface 118, an encoder 120, and a decoder 122.

One or more processors 106 may be any conventional processor, such as commercially available microprocessors. Alternatively, the one or more processors may be a dedicated device such as an application-specific integrated circuit (ASIC) or another hardware-based processor. Although FIG. 1 functionally illustrates the processor, memory, and other elements of the first device 102 as being within a same block, it will be understood by those of ordinary skill in the art that the processor, computing device, or memory may actually include multiple processors, computing devices, or memories that may or may not be stored within a same physical housing. Similarly, the memory may be a hard drive or other storage media located in a housing different from that of the first device 102. Accordingly, references to a processor or computing device will be understood to include references to a collection of processors or computing devices or memories that may or may not operate in parallel.

Memory 108 may store information that is accessible by the processors, including data 112 and instructions 110 that may be executed by the processors 106. The memory 108 may be a type of memory operative to store information accessible by the processors 106, including a non-transitory computer-readable medium, or another medium that stores data that may be read with the aid of an electronic device, such as a hard-drive, memory card, read-only memory ("ROM"), or random access memory ("RAM"), optical disks, or other write-capable and read-only memories. The subject matter disclosed herein may include different combinations of the foregoing, whereby different portions of the instructions 110 and data 112 are stored on different types of media.

The memory 108 may be retrieved, stored, or modified by the processors 106 in accordance with the instructions 110. For instance, although the present disclosure is not limited by a particular data structure, the data 112 may be stored in computer registers, a relational database as a table having a plurality of different fields and records, XML documents, or flat files. The data 112 may also be formatted in a computer-readable format such as, but not limited to, binary values, ASCII, or Unicode. Moreover, the data 112 may comprise information sufficient to identify relevant information, such as numbers, descriptive text, proprietary codes, pointers, references to data stored in other memories (including other network locations), or information that is used by a function to calculate the relevant data.

The instructions 110 can be any set of instructions to be executed directly, such as machine code, or indirectly, such as scripts, by the processor 106. In that regard, the terms "instructions," "application," "steps," and "programs" can be used interchangeably herein. The instructions can be stored in object code format for direct processing by the processor, or in any other computing device language including scripts or collections of independent source code modules that are interpreted on demand or compiled in advance. Functions, methods, and routines of the instructions are explained in more detail below.

Although FIG. 1 functionally illustrates the processor, memory, and other elements of devices 102, 104 as being within the same respective blocks, it will be understood by those of ordinary skill in the art that the processor or memory may actually include multiple processors or memories that may or may not be stored within the same physical housing. Similarly, the memory may be a hard drive or other storage media located in a housing different from that of the devices 102, 104. Accordingly, references to a processor or computing device will be understood to include references to a collection of processors or computing devices or memories that may or may not operate in parallel.

The first device 102 may include one or more microphones 114. The one or more microphones 114 may be able to capture, or receive, audio signals and/or input within an environment. The one or more microphones 114 may be built into the first device 102. For example, the one or more microphones 114 may be located on a surface of a housing of the first device 102. The one or more microphones 114 may be positioned at different coordinates around an environment where the first device 102 is located. For example, the first device 102 may have a right, left, and center microphone built into the first device 102. The right, left, and center microphones 114 may be positioned at different coordinates on the first device 102 relative to each other. In some examples, the one or more microphones 114 may be wired and/or wirelessly connected to the first device 102 and positioned around the environment at different coordinates relative to the first device 102. For example, a first microphone 114 that is wirelessly connected to the first device 102 may be positioned at a height above and to the left relative to the first device 102, while a second microphone 114 that is wirelessly connected to the first device 102 may be positioned below, to the right, and to the front relative to the first device 102. In some examples, each of the one or more microphones 114, whether built-in, wirelessly connected, and/or connected via a wire, may be positioned on the first device 102 and/or around the environment at different distances relative to the first device 102.

The first device 102 may further include a communications interface 118, such as an antenna, a transceiver, and any other devices used for wireless communication. The first device 102 may be connected to the second device 104 via a wireless connection and/or communication link.

The first device 102 may transmit content to the second device 104 via the communication link. The content may be, for example, encoded audio. According to some examples, the first device 102 may receive content from the second device 104 via the communication link. The content may include audio signals picked up by microphones 132 on the second device 104.

The first device 102 may include an encoder 120. The encoder 120 may encode audio signals captured by the microphones 114. The audio signals may be encoded with a relative location of or direction to a source emitter of the audio. The relative location of, or direction to, the source emitter of the audio may be a location relative to the location of the first device 102 or a relative direction from the first device 102 to the source emitter, respectively. According to some examples, the audio signals may be encoded with a timestamp of when the audio signal was received by the microphone 114. The encoded audio may, in some examples, include the audio data, location or direction information, and/or a time stamp.

The first device 102 may include a decoder 122. The decoder 122 may decode received encoded audio to correspond, or substantially correspond, to how a user would have heard the audio signals being received by the first device. According to some examples, the decoder 122 may decode the encoded audio. The decoded audio may be output spatially to correspond to how the user would have heard the audio if they were positioned where the first device 102 was positioned in the environment. In some examples, the decoder 122 may decode the encoded audio based on the number of speakers 116 in the first device 102.

The first device 102 may include one or more speakers 116. The speakers 116 may output the decoded audio. According to some examples, if the first device 102 includes two speakers, such as a left and a right speaker, sound encoded with data indicating the sound source was to the right of the second device 104 may be output such that more sound is output from the right speaker than from the left speaker. Additionally or alternatively, the two speakers may work together through magnitude and phase modulation to make the outputs sound as if more sound is output from the right than from the left.

By way of example, phase modulation may be where the sound waves for the output audio signal are given a phase shift for each speaker used to output the sound waves. This phase shift may be based on a fixed or a dynamic time dependence such that the output from the two speakers causes the sound waves arriving at a user's left ear to be out of phase with the sound waves arriving at a user's right ear. This mimics the way in which sound waves might arrive at a user's ears when emanating from a source emitter in a direction relative to a fixed point, the fixed point in this case being the user's head. This produces the effect for the user of the sound having come from the direction. Similarly, magnitude (or amplitude) modulation adjusts the relative amplitude of the left and right sound wave outputs to achieve similar results, the adjustment being either dynamic or fixed. Phase and magnitude/amplitude modulation techniques may be used alone or in concert to achieve the effect of the user perceiving the audio output from the two speakers, which may each be a fixed distance and in a fixed direction from the user's head, as coming from any direction, including above or below the user's head.

The second device 104 may include one or more processors 124, memory 126, instructions 128, data 130, one or more microphones 132, one or more speakers 134, a communications interface 136, an encoder 138, and a decoder 140 that are substantially similar to those described herein with respect to the first device 102.

Example Methods

Figure 2A:
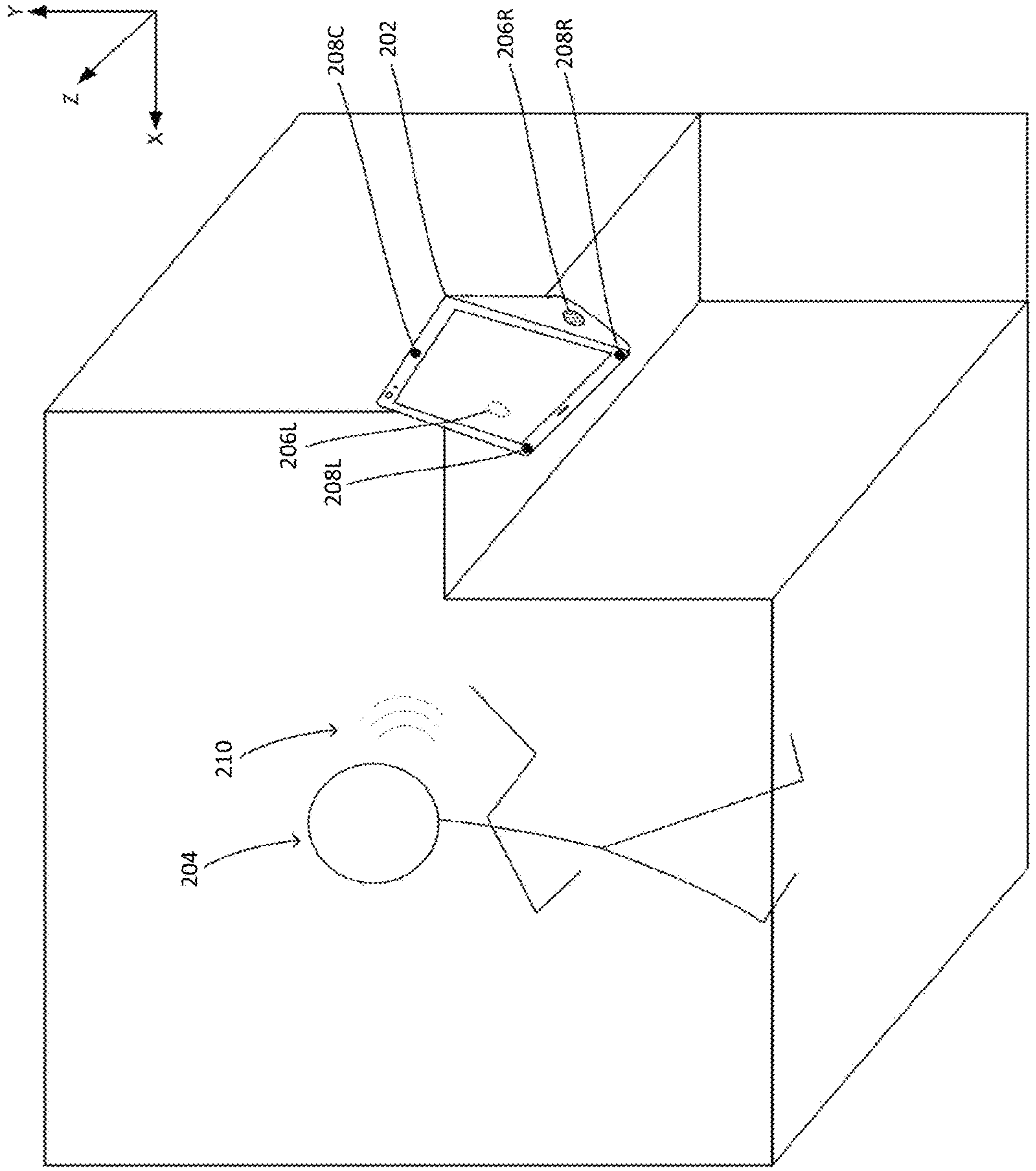
FIGS. 2A and 2B illustrate example environments for capturing audio signals in accordance with aspects of the disclosure.
Figure 2B:
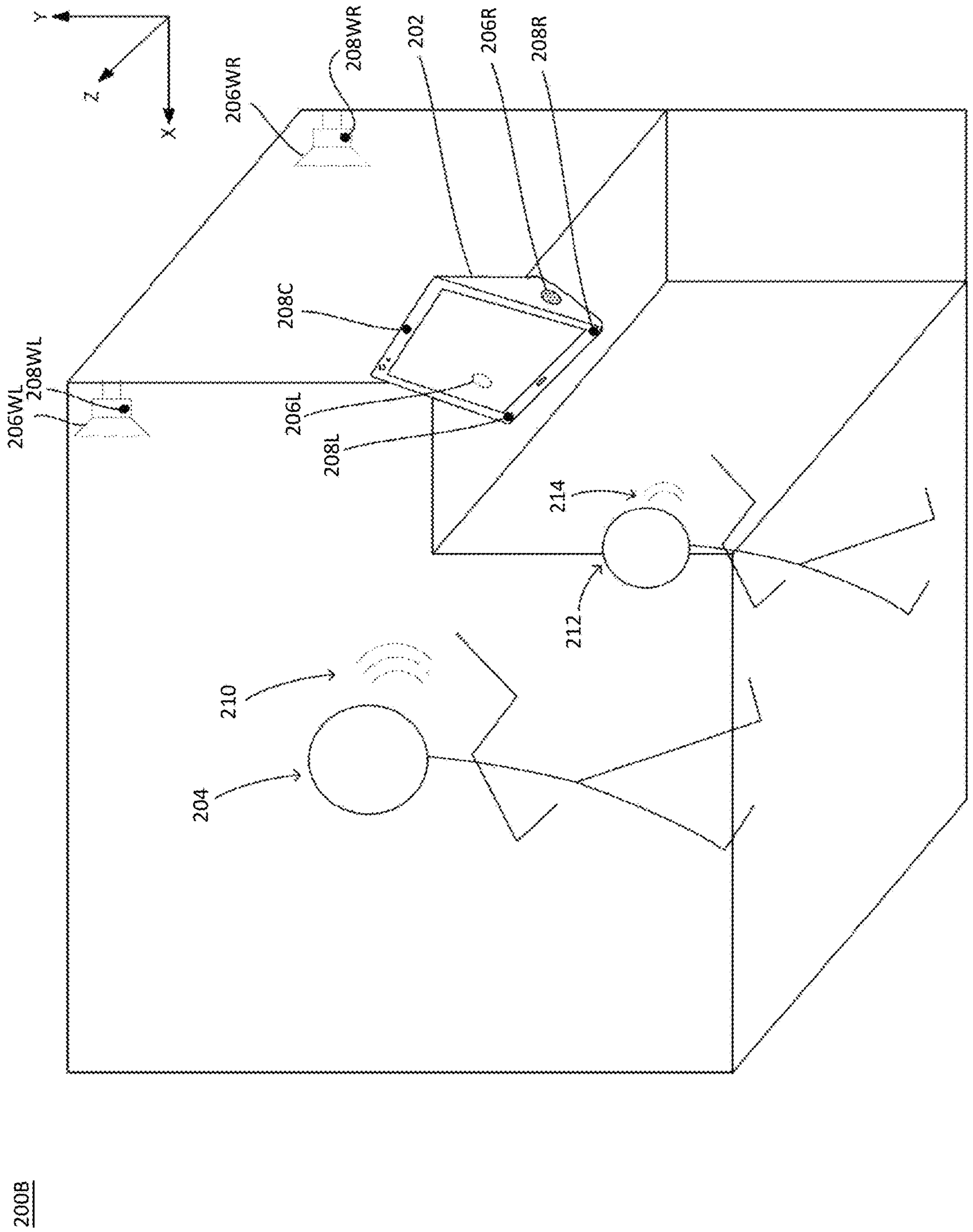

FIGS. 2A and 2B illustrate example environments for capturing audio signals. For example, environment 200A may include a first device 202 and an audio source emitter. In this example, the audio source emitter may be a user 204.

The first device 202 may include speakers 206R, 206L. Speaker 206R may be located on a right side of the first device 202 and speaker 206L may be located on a left side of the first device 202 from a perspective of the user 204 facing the first device.

The first device 202 may include microphones 208R, 208L, 208C. As shown, microphones 208R, 208L, 208C may be part of the first device 202. In some examples, microphones 208R, 208L, 208C may be wirelessly coupled to the first device 202 and/or coupled to the first device 202 via a wire. Microphone 208R may be located on the right side of the first device 202, microphone 208L may be located on the left side of the first device 202, and microphone 208C may be located in the center of the device 202 from the perspective of the user 204 facing the first device 202. In some examples, microphone 208C may be located at the top of the first device 202 while both microphones 208R, 208L may be located at the bottom of the first device 202. That is, microphones 208R, 208L, 208C may be positioned on the first device 202 at different coordinates relative to each other.

As shown in FIG. 2B, the first device 202 may additionally or alternatively include additional microphones 208WL, 208WR positioned around environment 200B. In some examples, microphones 208WL, 208WR may be part of speakers 206WL, 206WR, respectively. Speakers 206WL, 206WR may be wirelessly connected and/or connected via a wire to the first device 202. Additionally or alternatively, microphones 208WL, 208WR may be a separate component from speakers 206WL, 206WR such that microphones 208WL, 208WR are wirelessly connected and/or connected via a wire to the first device 202. Microphones 208WL, 208WR may be positioned at different height levels relative to each other and/or at different distances relative to the first device 202. For clarity purposes, microphone 208 may be used to refer to more than one microphone within environments 200A, 200B whereas microphone 208R, 208L, 208C, 208WL, 208WR may be used to refer to the specific microphone within environments 200A, 200B.

Each microphone 208 may capture audio signals 210 from the environment 200A, 200B at a different time based on the relative coordinates of the microphones 208 to each other. The audio signals may be, for example, speech of the user 204. The user 204 may be located to the left of the first device 202. As the user 204 speaks, each microphone 208 may capture the audio signals 210 at a different time. For example, microphone 208L may capture the audio signals 210 first, microphone 208C may capture the audio signals 210 second, and microphone 208R may capture the audio signals 210 last based on the distance audio signals 210 have to travel to reach microphones 208R, 208L, and 208C.

In some instances, only a subset of microphones may receive an audio signal 210. For instance, if the audio signal is relatively soft, only the left microphone 208L, or the left and center microphones 208L, 208C, may capture the audio signal 210. While a right, center, and left microphone 208R, 208WR, 208C, 208L, 208WL are described, it is only one example configuration of microphones and is not intended to be limiting. For example, the first device 202 may additionally or alternatively include additional microphones positioned around an environment, at different height levels relative to each other and/or at different distances relative to the first device. Thus, the device may include any number of microphones at any location within the environment. Additionally or alternately, microphones may be detached from the device 202 and arranged geometrically around device 202. By way of example only, the device 202 could be a smartphone with wireless microphones arranged at different positions relative to the smartphone.

The first device 202 may determine the location of the user 204, the sound emitter for the audio signal 210, within the environment 200A, 200B based on the known location of the microphones 208 of the first device 202 and the time each microphone receives the audio signal 210. The location of the user 204 may be the location of the source of the audio signals 210. In some examples, when the audio signals 210 are from the user 204 speaking, the source of the audio signals 210 may be the mouth of the user 204.

The first device 202 may triangulate the location of the source of the audio relative to the first device 202 by comparing when each microphone 208 of the first device 202 received the audio signal 210. The relative location of or direction to the audio source emitter compared to the first device 202 may be identified using Cartesian coordinates (e.g., x-, y-, and z-axes), spherical polar coordinates (e.g., phi, theta, and r), etc.

In some examples, the first device 202 may determine the direction to the source emitter 204 by using a direction from each microphone 208 to the source emitter. The one or more processors 101 may determine a combined direction to the source emitter 204, where the combined direction is related to the directions from the two or more microphones 208. For instance, the combined direction may be determined by comparing the angles made from the directions associated with each of the microphones 208. How the angular combination of directions generates the combined direction may be a function of the arrangement of the microphones 208 on the first device 202. Additionally or alternately, other methods of determining a combined direction from the individual microphone 208 directions may be employed, such as comparing relative signal strength between audio signals at each microphone 208, time of receipt for each audio signal, etc. These examples of combined direction determination are meant as illustrations only, and not as limitations. Any number of methods known to a practitioner skilled in the art may be employed to determine a combined direction from the individual directions from each microphone 208.

The audio data associated with the audio signals 210 received by the first device 202 may be encoded with the relative direction to the source emitter 204. According to some examples, the audio data may be additionally or alternatively encoded with a timestamp of when the audio signals 210 were received by the microphones 208. The timestamp may be used, for example, when there is more than one audio source. For example, if two users 204, 212 are speaking, producing audio signals 210, 214, such as in FIG. 2B, the timestamp may be used during spatial reconstruction. The timestamp associated with when each microphone 208 receives audio signals 210, 214 may be used to differentiate which audio signal 210, 214 corresponds to which source, or user 204, 212. Each audio signal 210, 214 may be encoded separately with the direction to the source emitter, such as the relative location of user 204, 212, respectively. In some examples, instead of and/or in addition to a timestamp, the audio data may be encoded with time sequence numbers and/or other headers that can differentiate between different sources of audio signals at a same time slice. Thus, the encoded audio may include one or more of a relative location of the source of the audio input, direction to the source emitter, audio data, or timestamp and/or time sequence number of the audio input. According to some examples, if the first device 202 includes only one microphone 208, the audio captured by the microphone 208 may be mono audio.

The first device 202 may transmit the encoded audio to a second device 302. For example, each of the first and second devices 202, 302 may include one or more speakers 206, 306 for outputting audio signals. The second device 302 may output the encoded audio spatially based on a number and/or configuration of the speakers 306. This may allow for a user to have an immersive audio experience. According to some examples, the spatial audio output may correspond to how the user would have heard the audio if they were positioned where the first device 202 was positioned in environment 200A, 200B relative to the source emitter 204.

By encoding the audio data, relative location, direction, and/or timestamp of the audio input, the data required to transmit the audio to the second device may be decreased as compared to transmitting the audio via multiple and/or separate channels. For example, the encoded audio may compress the signals to be transmitted to the second device. Additionally or alternatively, by encoding the audio with the relative location, direction, audio data, and/or timestamp of the audio input, the device receiving the encoded audio may be able to spatially output the audio data.

In some examples, when the determined location of the source of the audio input received by the first device is consistent and/or substantially consistent for the entirety of the audio input received by the first device, the determined location may not be encoded with the entirety of the audio data. For example, initial audio data associated with the audio input may include the determined direction to the source emitter of the audio input. The initial encoded audio may be transmitted to the second device. If the first device determines that the location of the source of the audio input has not changed and/or has not substantially changed, the direction to the source emitter may not be included with the subsequent audio data transmitted to the second device. This may allow the first device to compress the audio being transmitted to the second device to be smaller than encoded audio including location information. Additionally or alternatively, transmitting audio without repetitive direction information may use less data than transmitting audio encoded with direction information.

According to some examples, the first device 202 may transmit the encoded audio data to the second device 302 as a single audio stream. In some examples, the first device 202 may transmit the encoded audio data to the second device 302 in separate channels. Each channel may correspond to a relative location of or direction to the source emitter of the audio input. For example, there may be a left channel, a right channel, a back channel, etc. The left channel may correlate to the audio input with a location determined to be from a left direction relative to the device, the right channel may correlate to the audio input with a location determined to be from a right direction relative to the device, etc. The second device 302 may output the received encoded audio data based on the channel the first device transmitted the encoded audio in.

Figure 3A:
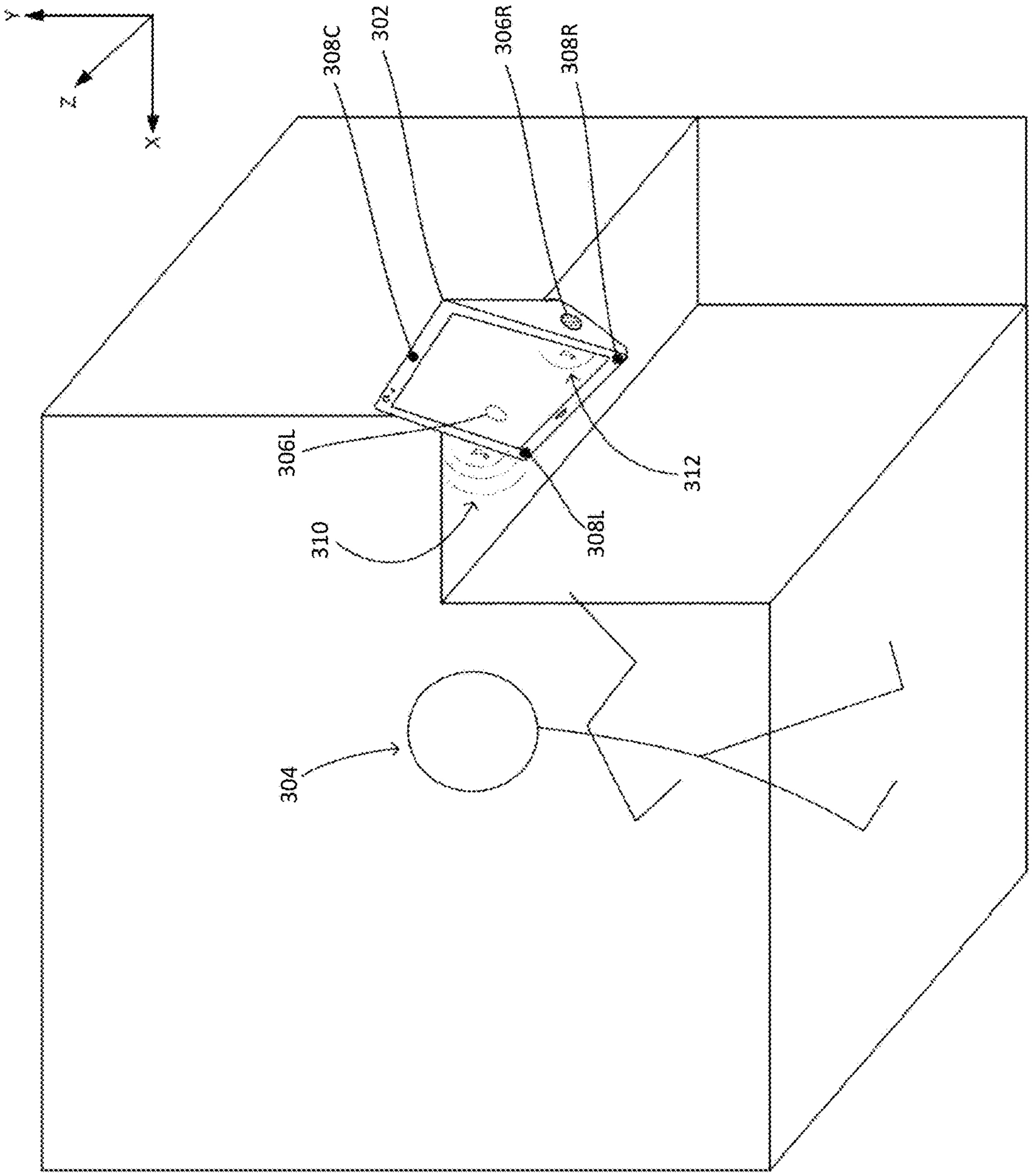
FIGS. 3A and 3B illustrate example environments for outputting audio signals in accordance with aspects of the disclosure.
Figure 3B:
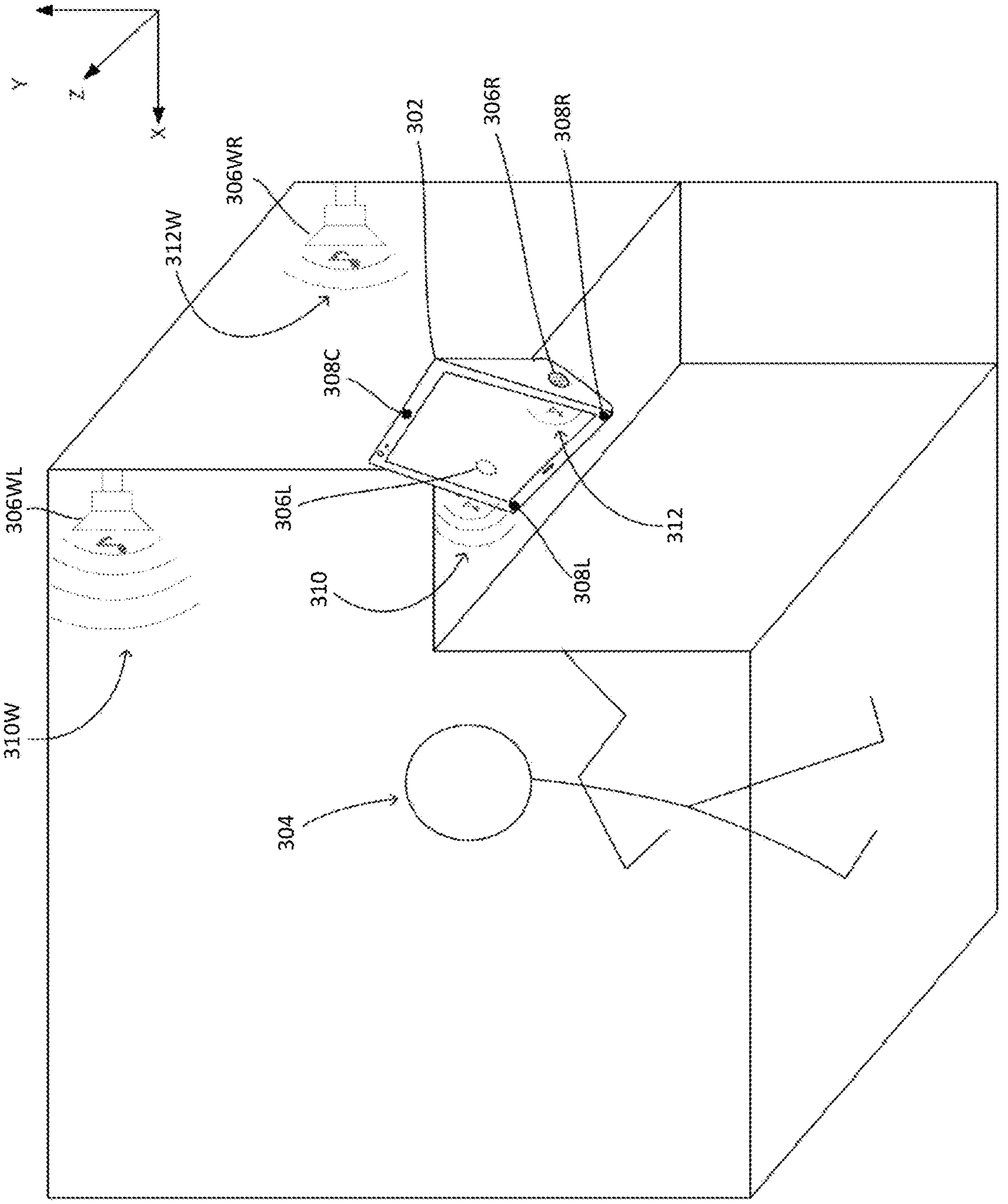

FIGS. 3A and 3B illustrate example environments for outputting audio signals. For example, environments 300A, 300B may include a second device 302 and a listener, such as a user 304.

The second device 302 may include microphones 308R, 308L, 308C similar to the microphones 208 described with respect to the first device 202. The second device 302 may include speakers 306R, 306L for outputting audio signals. Speaker 306R may be located on a right side of the second device 302 and speaker 306L may be located on a left side of the second device 302 from the perspective of the user 304 facing the second device. As shown in FIG. 3A, speakers 306R, 306L may be part of the second device 302. In some examples, the speakers 306 may be separate from device 302 and wirelessly coupled to the second device 302 and/or coupled to the second device 302 via a wire. For example, FIG. 3B shows an environment 300B that includes additional speakers 306WL, 306WR coupled to the second device 302.

The second device 302 may receive the audio data from the first device 202. If the audio data is encoded, the second device 302 may decode the encoded audio data. The second device 302 may output an audio signal to the user 304 to correspond, or substantially correspond, to how the user 304 would have heard the audio signals were the user 304 at the location of the first device 202 at the time of audio signal capture. In some examples, the second device 302 may output audio to correspond to how the user 304 would have heard the audio if they were positioned where the user 204 was located within environment 200A, 200B.

According to some examples, the second device 302 may output audio based on a number of speakers 306 the second device 302 has. For example, as shown in FIG. 3A, the second device 302 may include two speakers: left speaker 306L and right speaker 306R. The audio data may identify a location of or direction to a virtual audio signal emitter as originating from the left of the device. The second device 302 may output audio such that more sound 310 is output from left speaker 306L than sound 312 being output from right speaker 306R. In some examples, left speaker 306L and right speaker 306R may work together through magnitude and phase modulation to make the outputs sound as if more sound is output from the left than from the right, or that the sound has emanated from the left direction relative to the user 304. According to some examples, if the second device 302 includes only one speaker, a decoder will output audio as mono audio.

FIG. 3B illustrates an environment 300B in which additional speakers 306 may be connected to the second device 302. Speakers 306WL, 306WR may be positioned around environment 300B at different coordinates, heights, and/or distances relative to other speakers 306 and/or the second device 302. The second device 302 may decode the encoded audio based on the four speakers 306R, 306L, 306WR, 306WL available for audio output. According to some examples, encoded audio data may indicate the direction to the source of the audio signals to be above and to the left of the first device 202. In such an example, the second device 302 may output audio to correspond to how a user 304 would have heard the audio signals if the user 304 were positioned where the first device 202 was positioned in environment 200A, 200B. The second device 302 may, therefore, output audio such that top left speaker 306WL may output more sound 310W than top right speaker 306WR. According to some examples, top left speaker 306WL may output more sound than left speaker 306L. Additionally or alternatively, speaker 306L may output more sound 310 than right speaker 306R. In some examples, outputting more sound may correspond to outputting sound with a greater volume.

By outputting more sound from top left speaker 306WL and left speaker 306L as compared to top right speaker 306WR and right speaker 306R, the audio may be spatially output. Additionally or alternatively, the speakers may work together through magnitude and phase modulation. That is, the user 304 may hear the spatially output audio as if the user 304 was in the same, or substantially the same, location as the first device 202 relative to the user 204.

According to some examples, the second device 302 may output audio based on the channel in which the audio data was transmitted and/or received. For example, the first device 202 may receive audio signals captured by right microphone 208R, left microphone 208L, and center microphone 208C to be transmitted via a respective right, left, and center channel. The second device 302 may receive the audio data for each channel and output the audio by a respective speaker 306. For example, audio transmitted via the right channel may be output by right speakers 306R, 306WR, audio transmitted via the left channel may be output by left speakers 306L, 306WL, and/or audio transmitted via the center channel may be split between the right and left speakers. Additionally or alternatively, the speakers may work together through magnitude and/or phase modulation to make the outputs sound more as if they are coming from the direction that was derived from the incoming channels.

Additional speaker configurations relative to the user 304 may also be employed. Though not pictured, speakers 306L and 306R may be speakers of left and right earbuds or hearing aids, respectively. These speakers 306L, 306R may output the audio spatially, such that the user 304 perceives the audio as emitting from the direction that was derived from the incoming channels.

While the above discusses the second device 302 receiving the audio data from the first device 202, the first device 202 may also be configured to receive audio data from the second device 302. The first device 202 may output the audio in the same or substantially the same way as the second device 302.

Figure 4:
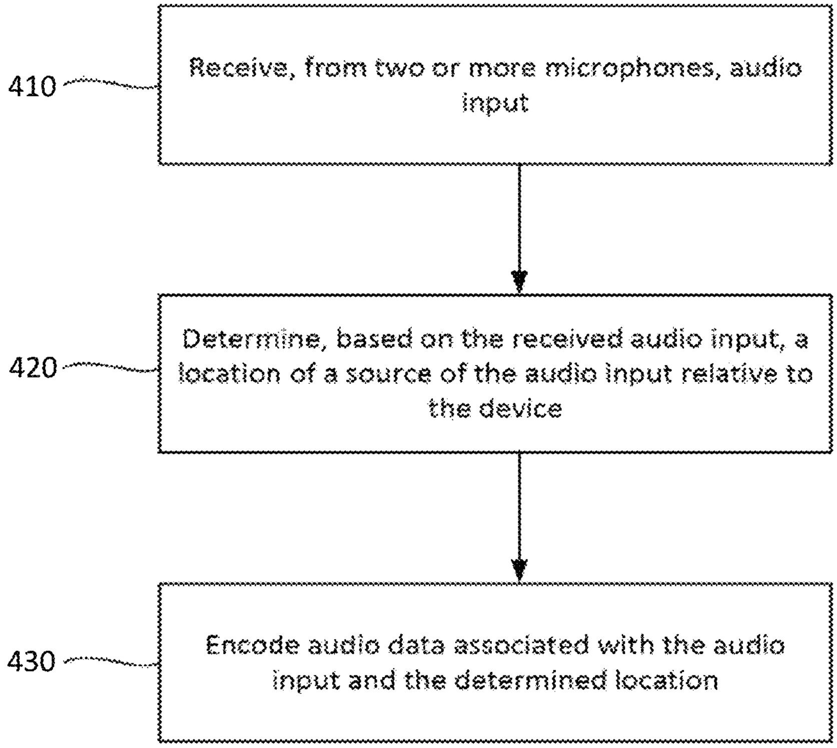
FIG. 4 is a flow diagram illustrating an example method of encoding audio data with audio input according to aspects of the disclosure.

FIG. 4 illustrates an example method for encoding audio data with audio input and a determined location. The following operations do not have to be performed in the precise order described below. Rather, various operations can be handled in a different order or simultaneously, and operations may be added or omitted.

In block 410, a device may receive, from two or more microphones, audio input. For example, the device may be within an environment. The two or more microphones may be built into the device, wirelessly coupled to the device, and/or connected to the device via a wire. The microphones may be configured to capture audio input and/or audio signals. The audio input may be, for example, speech of a user.

In block 420, the device may determine, based on the received audio input, a location of a source of the audio input relative to the device. For example, if the audio input is the speech of a user, the device may determine the location of, or direction to, the user speaking relative to the device. In such an example, the device may be configured to triangulate the location of the source of the audio input based on a time each of the microphones received the audio input. For example, if the user speaking is standing to the right of the device, a microphone on the right side of the device may capture, or receive, the speech of the user before a microphone on the left side of the device. Based on the time each microphone receives the audio input, the device may determine the location relative to the device.

In block 430, the device may encode audio data associated with the audio input and the determined location. For example, the device may include an encoder configured to encode the audio data associated with the audio input and the determined location. According to some examples, the encoder may encode the audio data and the determined location with a timestamp. The timestamp may indicate a time each of the microphones received the audio input.

According to some examples, the device may transmit the encoded audio to a second device for output. In some examples, the device may receive encoded audio from the second device. The device may output the received encoded audio based on a speaker configuration of the device. For example, if the device includes two speakers, such as a left speaker and a right speaker, sound encoded with audio data and the determined location indicating sound coming from the right may be output such that more sound is output from the right speaker than from the left speaker.

The device may further include a decoder configured to decode the received encoded audio. The decoder may decode the received encoded audio based on the number of speakers the device has. In some examples, the decoder may decode the received encoded audio based on the location of the speakers. The device may decode the encoded audio to correspond, or substantially correspond, to how the user would have heard the audio being received by the second device.

Unless otherwise stated, the foregoing alternative examples are not mutually exclusive but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

Additional Examples

In the following section, examples are provided.

Example 1: A device, comprising one or more processors, the one or more processors configured to receive, from two or more microphones, audio input; determine, based on the received audio input, a location of a source of the audio input relative to the device; and encode audio data associated with the audio input and the determined location.

Example 2: The device of example 1, wherein the one or more processors are further configured to encode the audio data and the determined location with a timestamp, wherein the timestamp indicates a time the two or more microphones received the audio input.

Example 3: The device of example 1, wherein when determining the location of the source the one or more processors are further configured to triangulate the location based on a time each of the two or more microphones received the audio input.

Example 4: The device of example 1, wherein the one or more processors are configured to receive encoded audio from a second device.

Example 5: The device of example 4, wherein the one or more processors are further configured to decode the received encoded audio.

Example 6: The device of claim 5, further comprising two or more speakers, wherein when decoding the received encoded audio the one or more processors are configured to decode the received encoded audio based on the two or more speakers.

Example 7: The device of example 4, further comprising two or more speakers, wherein the one or more processors are further configured to output the received encoded audio based on the two or more speakers.

Example 8: A method, comprising receiving, by one or more processors from a device including two or more microphones, audio input; determining, by the one or more processors based on the received audio input, a location of a source of the audio input relative to the device; and encoding, by the one or more processors, audio data associated with the audio input and the determined location.

Example 9: The method of example 8, further comprising, encoding, by the one or more processors, the audio data and the determined location with a timestamp, wherein the timestamp indicates a time the two or more microphones received the audio input.

Example 10: The method of example 8, wherein when determining the location of the source the method further comprises triangulating, by the one or more processors, the location based on a time each of the two or more microphones received the audio input.

Example 11: The method of example 8, further comprising receiving, by the one or more processors, encoded audio from a second device.

Example 12: The method of example 11, further comprising decoding, by the one or more processors, the received encoded audio.

Example 13: The method of example 12, wherein the device further includes two or more speakers, and wherein when decoding the received encoded audio the method further comprises decoding, by the one or more processors and based on the two or more speakers, the received encoded audio based on the two or more speakers.

Example 14: The method of example 11, wherein the device further includes two or more speakers, and wherein the method further comprises outputting, by the one or more processors and based on the two or more speakers, the received encoded audio.

Example 15: A non-transitory computer-readable medium storing instructions, which when executed by one or more processors cause the one or more processors to receive, from two or more microphones, audio input; determine, based on the received audio input, a location of a source of the audio input relative to a device; and encode audio data associated with the audio input and the determined location.

Example 16: The non-transitory computer-readable medium of example 15, wherein the one or more processors are further configured to encode the audio data and the determined location with a timestamp, wherein the timestamp indicates a time the two or more microphones received the audio input.

Example 17: The non-transitory computer-readable medium of example 16, wherein when determining the location of the source the one or more processors are further configured to triangulate the location based on a time each of the two or more microphones received the audio input.

Example 18: The non-transitory computer-readable medium of example 16, wherein the one or more processors are configured to receive encoded audio from a second device.

Example 19: The non-transitory computer-readable medium of example 18, wherein the one or more processors are further configured to decode the received encoded audio.

Example 20: The non-transitory computer-readable medium of example 19, further comprising two or more speakers, wherein when decoding the received encoded audio the one or more processors are configured to decode the received encoded audio based on the two or more speakers.

Example 21: A method comprising receiving a first audio signal sensed by a first audio sensor, the received first audio signal sensed from first sound waves emitted by a source emitter, the first audio sensor oriented in a first direction with respect to the source emitter; receiving a second audio signal sensed by a second audio sensor, the received second audio signal sensed from second sound waves emitted by the source emitter, the second audio sensor oriented in a second direction with respect to the source emitter; determining, based on the received first and second audio signals, a combined direction, the combined direction related to the first direction and the second direction; and generating audio data, the audio data configured for output by an output device, the audio data including an output audio signal associated with the first and second sound waves emitted by the source emitter and the combined direction.

Example 22: The method of example 21, wherein the received first audio signal and the received second audio signal are based on first and second sound waves, respectively, emitted from the source emitter at a same time.

Example 23: The method of example 21, wherein the first and second audio sensors are first and second microphones, respectively, arranged around a recording device, the method being performed by the recording device, the recording device being a mobile computing device, a smartphone, a smart watch, true wireless earbuds, hearing aids, an AR/VR headset, a smart helmet, a computer, a laptop, a tablet, or a home assistant device.

Example 24: The method of example 21, wherein the output audio signal is separated into multiple channel audio signals, each of the multiple channel audio signals associated with one of the audio sensors.

Example 25: The method of example 21, wherein the determination of the combined direction is based at least in part on comparing a first timestamp for the received first audio signal and a second timestamp for the received second audio signal, wherein the first and second timestamps indicate a time of receipt of the first and second sound waves from the source emitter at the first and second audio sensors, respectively.

Example 26: The method of example 21, wherein the determination of the combined direction is based at least in part on comparing a first signal strength for the received first audio signal and a second signal strength for the received second audio signal.

Example 27: A device, comprising a first audio sensor; a second audio sensor; and one or more processors, the one or more processors configured to receive, by the first audio sensor, a first audio signal, the first audio signal sensed from first sound waves emitted by a source emitter, the first audio sensor oriented in a first direction with respect to the source emitter; receive, by the second audio sensor, a second audio signal, the second audio signal sensed from second sound waves emitted by the source emitter, the second audio sensor oriented in a second direction with respect to the source emitter; determine, based on the first and second audio signals, a combined direction, the combined direction related to the first direction and the second direction; and generate audio data, the audio data configured for output by an output device, the audio data including an output audio signal associated with the first and second sound waves emitted by the source emitter and the combined direction.

Example 28: The device of example 27, wherein the first audio signal and the second audio signal are based on first and second sound waves, respectively, emitted from the source emitter at a same time.

Example 29: The device of example 27, wherein the first and second audio sensors are first and second microphones, respectively, arranged around the device, the device being a mobile computing device, a smartphone, a smart watch, true wireless earbuds, hearing aids, an AR/VR headset, a smart helmet, a computer, a laptop, a tablet, or a home assistant device.

Example 30: The device of example 27, wherein the determination of the combined direction is based at least in part on comparing a first timestamp for the received first audio signal and a second timestamp for the received second audio signal, wherein the first and second timestamps indicate a time of receipt of the first and second sound waves from the source emitter at the first and second audio sensors, respectively.

Example 31: The device of example 27, wherein the determination of the combined direction is based at least in part on comparing a first signal strength for the received first audio signal and a second signal strength for the received second audio signal.

Example 32: An audio output device comprising one or more processors, the one or more processors configured to receive audio data, the audio data including an output audio signal and a direction, and configure, based on the direction, the output audio signal for output by two or more speakers, the configuration including at least one of determining an output time for each of the two or more speakers or determining an output volume for each of the two or more speakers.

Example 33: The audio output device of example 32, wherein the determination of an output time for each of the two or more speakers comprises a phase modulation of the audio signal, the phase modulation comprising adjustment of a phase of a sound wave based on time and the speaker of the two or more speakers that is used for output, and wherein the determination of an output volume for each of the two or more speakers comprises an amplitude modulation of the audio signal, the amplitude modulation comprising adjustment of a volume of a sound wave based on time and the speaker of the two or more speakers that is used for output.

Example 34: The audio output device of example 32, further comprising two or more speakers, wherein the one or more processors are further configured to output the output audio signal to the two or more speakers, and wherein the output of the output audio signal arrives at a fixed point with a same audio composition as if the signal had come from a source emitter in the direction, the direction being relative to the fixed point.

Example 35: The audio output device of example 34, wherein the fixed point is a head of a user.

Example 36: The audio output device of example 32, wherein the audio data is encoded with at least the audio output signal and the direction, and the one or more processors are further configured to decode the audio data.

Example 37: A non-transitory computer-readable medium storing instructions, which when executed by one or more processors cause the one or more processors to receive a first audio signal sensed by a first sensor, the first audio signal sensed from first sound waves emitted by a source emitter, the first audio sensor oriented in a first direction with respect to the source emitter; receive a second audio signal sensed by a second sensor, the second audio signal sensed from second sound waves emitted by the source emitter, the second audio sensor oriented in a second direction with respect to the source emitter; determine, based on the received first and second audio signals, a combined direction, the combined direction related to the first direction and the second direction; and generate audio data, the audio data configured for output by an output device, the audio data including an output audio signal associated with the sound waves emitted by the source emitter and the combined direction.

Example 38: The non-transitory computer-readable medium of example 37, wherein the first and second audio sensors are first and second microphones, respectively, arranged around a recording device, the recording device comprising the one or more processors and being a mobile computing device, a smartphone, a smart watch, true wireless earbuds, hearing aids, an AR/VR headset, a smart helmet, a computer, a laptop, a tablet, or a home assistant device.

Example 39: The non-transitory computer-readable medium of example 37, wherein the determination of the combined direction is based at least in part on comparing a first timestamp for the received first audio signal and a second timestamp for the received second audio signal, wherein the first and second timestamps indicate a time of receipt of the first and second sound waves from the source emitter at the first and second audio sensors, respectively.

Example 40: The non-transitory computer-readable medium of example 37, wherein the determination of the combined direction is based at least in part on comparing a first signal strength for the received first audio signal and a second signal strength for the received second audio signal.

CONCLUSION

Although implementations of devices, methods, and systems directed to spatial audio communication between devices have been described in language specific to features and/or methods, it is to be understood that the subject of the appended claims is not necessarily limited to the specific features or methods described. Rather, the specific features and methods are disclosed as example implementations of devices, methods, and systems directed to spatial audio communication between devices.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

What is claimed is:

1. A method comprising:
- receiving a first audio signal sensed by a first audio sensor, the received first audio signal sensed from first sound waves emitted by a source emitter, the first audio sensor oriented in a first direction with respect to the source emitter;
- receiving a second audio signal sensed by a second audio sensor, the received second audio signal sensed from second sound waves emitted by the source emitter, the second audio sensor oriented in a second direction with respect to the source emitter;
- determining, based on the received first and second audio signals, a combined direction, the combined direction related to the first direction and the second direction;
- generating audio data, the audio data:
  - configured for output by an output device; and
  - comprising an output audio signal associated with the first and second sound waves emitted by the source emitter; and
- encoding the audio data with direction information, the direction information based on the combined direction.

2. The method of claim 1, wherein the received first audio signal and the received second audio signal are based on first and second sound waves, respectively, emitted from the source emitter at a same time.

3. The method of claim 1, wherein the first and second audio sensors are first and second microphones, respectively, arranged around a recording device, the method being performed by the recording device, the recording device being a mobile computing device, a smartphone, a smart watch, true wireless earbuds, hearing aids, an AR/VR headset, a smart helmet, a computer, a laptop, a tablet, or a home assistant device.

4. The method of claim 1, wherein the output audio signal is separated into multiple channel audio signals, each of the multiple channel audio signals associated with one of the audio sensors.

5. The method of claim 1, wherein the determination of the combined direction is based at least in part on comparing a first timestamp for the received first audio signal and a second timestamp for the received second audio signal, wherein the first and second timestamps indicate a time of receipt of the first and second sound waves from the source emitter at the first and second audio sensors, respectively.

6. The method of claim 5, wherein the direction information comprises the first timestamp and the second timestamp.

7. The method of claim 1, wherein the configuring of the audio data for output by an output device comprises:
- determining an output time for each of two or more speakers; or
- determining an output volume for each of the two or more speakers.

8. The method of claim 7, further comprising outputting, based on the direction information, the output audio signal to the two or more speakers, wherein the output of the output audio signal arrives at a fixed point with a same audio composition as if the signal had come from a source emitter in a fixed-point direction, the fixed-point direction being relative to the fixed point.

9. A device, comprising:
- a first audio sensor;
- a second audio sensor; and
- one or more processors, the one or more processors configured to:
  - receive, by the first audio sensor, a first audio signal, the first audio signal sensed from first sound waves emitted by a source emitter, the first audio sensor oriented in a first direction with respect to the source emitter;
  - receive, by the second audio sensor, a second audio signal, the second audio signal sensed from second sound waves emitted by the source emitter, the second audio sensor oriented in a second direction with respect to the source emitter;
  - determine, based on the first and second audio signals, a combined direction, the combined direction related to the first direction and the second direction;
  - generate audio data, the audio data:
    - configured for output by an output device; and
    - comprising an output audio signal associated with the first and second sound waves emitted by the source emitter; and
  - encode the audio data with direction information, the direction information based on the combined direction.

10. The device of claim 9, wherein the first audio signal and the second audio signal are based on first and second sound waves, respectively, emitted from the source emitter at a same time.

11. The device of claim 9, wherein the first and second audio sensors are first and second microphones, respectively, arranged around the device, the device being a mobile computing device, a smartphone, a smart watch, true wireless earbuds, hearing aids, an AR/VR headset, a smart helmet, a computer, a laptop, a tablet, or a home assistant device.

12. The device of claim 9, wherein the determination of the combined direction is based at least in part on comparing a first timestamp for the received first audio signal and a second timestamp for the received second audio signal, wherein the first and second timestamps indicate a time of receipt of the first and second sound waves from the source emitter at the first and second audio sensors, respectively.

13. The device of claim 9, wherein the determination of the combined direction is based at least in part on comparing a first signal strength for the received first audio signal and a second signal strength for the received second audio signal.

14. The device of claim 9, wherein the output audio signal is separated into multiple channel audio signals, each of the multiple channel audio signals associated with one of the audio sensors.

15. A non-transitory computer-readable medium storing instructions, which when executed by one or more processors cause the one or more processors to:
- receive a first audio signal sensed by a first sensor, the first audio signal sensed from first sound waves emitted by a source emitter, the first audio sensor oriented in a first direction with respect to the source emitter;
- receive a second audio signal sensed by a second sensor, the second audio signal sensed from second sound waves emitted by the source emitter, the second audio sensor oriented in a second direction with respect to the source emitter;
- determine, based on the received first and second audio signals, a combined direction, the combined direction related to the first direction and the second direction;
- generate audio data, the audio data:
  - configured for output by an output device; and
  - comprising an output audio signal associated with the first and second sound waves emitted by the source emitter; and
- encode the audio data with direction information, the direction information based on the combined direction.

16. The non-transitory computer-readable medium of claim 15, wherein the first and second audio sensors are first and second microphones, respectively, arranged around a recording device, the recording device comprising the one or more processors and being a mobile computing device, a smartphone, a smart watch, true wireless earbuds, hearing aids, an AR/VR headset, a smart helmet, a computer, a laptop, a tablet, or a home assistant device.

17. The non-transitory computer-readable medium of claim 15, wherein the determination of the combined direction is based at least in part on comparing a first timestamp for the received first audio signal and a second timestamp for the received second audio signal, wherein the first and second timestamps indicate a time of receipt of the first and second sound waves from the source emitter at the first and second audio sensors, respectively.

18. The non-transitory computer-readable medium of claim 15, wherein the determination of the combined direction is based at least in part on comparing a first signal strength for the received first audio signal and a second signal strength for the received second audio signal.

19. The non-transitory computer-readable medium of claim 15, wherein the received first audio signal and the received second audio signal are based on first and second sound waves, respectively, emitted from the source emitter at a same time.

20. The non-transitory computer-readable medium of claim 15, wherein the output audio signal is separated into multiple channel audio signals, each of the multiple channel audio signals associated with one of the audio sensors.

* * * * *